INVENTOR
HARRY B. BROWN

Nov. 10, 1970    H. B. BROW    3,539,904
AUTOMATIC TAPPING MACHINE CONTROL SYSTEM
Original Filed Sept. 10, 1965    3 Sheets-Sheet 3

INVENTOR
HARRY B. BROWN

United States Patent Office 3,539,904
Patented Nov. 10, 1970

3,539,904
AUTOMATIC TAPPING MACHINE CONTROL SYSTEM
Harry B. Brown, 2350 Duke St., Alexandria, Va. 22314
Original application Sept. 10, 1965, Ser. No. 486,419, now Patent No. 3,371,258, dated Feb. 27, 1968. Divided and this application Dec. 4, 1967, Ser. No. 707,903
Int. Cl. H02m 7/68; H02p 1/40
U.S. Cl. 321—45                                       3 Claims

ABSTRACT OF THE DISCLOSURE

In combination with a direct current electric motor which drives a thread tapping tool there is a power control system which governs the action of the motor so as to effect periodic reversals of the motor at arbitrary intervals and momentary reversals in response to motor overload. Pulsating D.C. is fed to the input terminals of an SCR bridge circuit whose output terminals are connected to the motor winding; and A.C. synchronized with the pulsating D.C. is phase controlled, shaped and routed to provide on-turning pulses for one of the other opposed pairs of the SCR's in the bridge so as to control the power and direction of the current through the motor winding. A switch opens the pulsating D.C. supply circuit to the bridge each time the voltage drop substantially to zero so as to prevent continuation of flow of current through the SCR's beyond the duration of the individual D.C. pulses which might otherwise result from the inductive load of the motor winding.

---

This is a division of application Ser. No. 486,419, filed Sept. 10, 1965.

This invention relates to power control systems for regulating the characteristics of electrical power supplied to a load and, more specifiically, to a system for regulating the power and direction of current supplied to a tool-driving motor. The specific application of the subject system is in combination with a direct-current motor which powers a thread-cutting machine.

The objects of the invention are to provide a control system which will cause the motor to drive a cutting tool, such as a thread tapper, in such manner that the power applied to the tool is closely regulated so that if an extra high torque load, approaching that at which the tool would break or the work would be damaged, is imposed upon the drive motor, the latter, will be caused to reverse momentarily and thereby try to clear the tool from whatever imposed and extra high torque load upon it, and if the extra high torque load persists despite the reversal, the energizing circuit for the motor will be opened. In conjunction with a load responsive reversal system, it is intended to provide a periodic reversing circuit so that the drive of the tool in one direction will be periodically reversed for brief intervals. Such periodical reversals have heretofore been accomplished by gear or hydraulic systems which are complex, cumbersome, and subject to backlash and/or inertia which militates against the sensitivities required to avoid damage to delicate tools or work. The electronic control system of this invention is of extreme sensitivity and takes appropriate action almost instantaneously when called upon to do so.

Lying at the heart of the invention is a silicon controlled rectifier bridge which is supplied by a train of direct current power pulses, and which routes the power pulses in one direction or the other through the armature winding of a direct current motor according to the desired direction of motor rotation. It is intended that the on-times of the rectifiers in the bridge be so regulated by a chain of control pulses that the bridge may be rendered conductive during any desired phase of each incoming power pulse so as to vary the power output of the bridge to the motor winding. Also intended are a feedback from the output of the bridge which controls the timing of the bridge control pulses and thus tends to maintain a desired constant speed of the motor under varying load conditions, and a load responsive device connected to the input of the bridge for momentarily reversing the direction of current supplied to the motor winding in event of overload.

These and other objects will be apparent from the following specification and drawings, in which.

Figure 1:
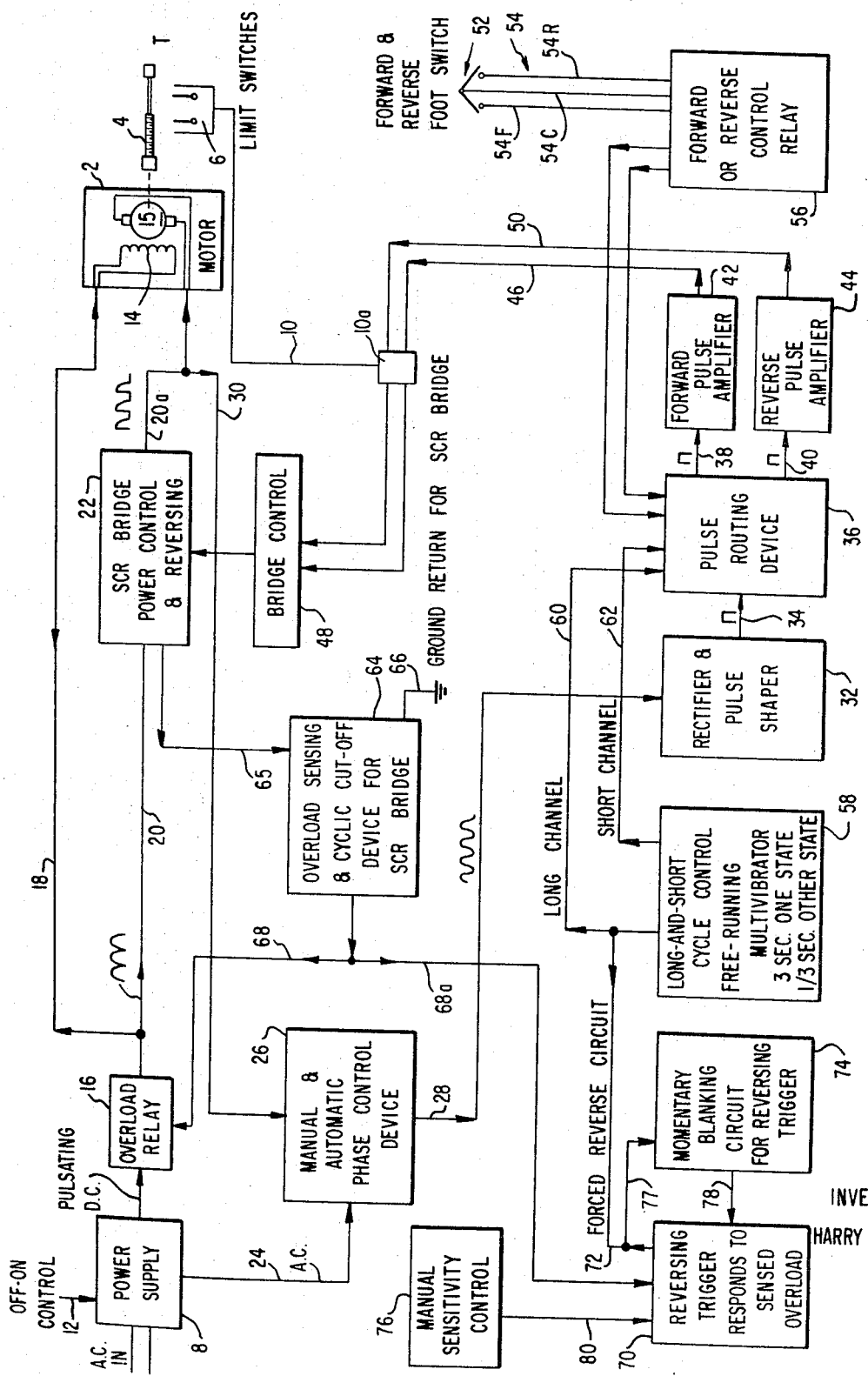
FIG. 1 is a block diagram of the system.

Referring now to the block diagram of FIG. 1, a direct current motor 2 is used to drive a tool T which, in this example, is a thread tapper. The tool is advanced to starting position by a threaded nut and screw shank feeding mechanism 4 associated with the tool chuck which drives the tool to starting position from which it pulls and subsequently withdraws itself into and from the work, all as more fully described in my co-pending application entitled Thread Tapper filed concurrently herewith. A limit switch pair 6 controls the pulse trains in lines 46 and 50 via circuit 10 and relays 10a so that motor 2 cannot run further forwardly or reversely, as the case may be, when the tool reaches one or the other desired limits of travel. An off-on control switch 12 is provided for power supply 12. The field 14 of motor 2 is energized with pulsating direct current derived from power supply 8 via an overload relay 16 and circuit 18, and the armature 15 of motor 2 is also supplied with pulsating direct current via a power supply circuit 20, 20a leading from overload relay 16 and including a silicon controlled rectifier (SCR) bridge 22 which controls the direction of current fed to motor 2 and also the power supplied thereto.

When a tool such as a thread tapper, and particularly a fragile one of small diameter, is manually operated, it is ordinarily given several forward turns and then a reverse turn or two in order to clear the crumbs of metal from the cut. Also, at any time the tool imposes excessive resistance to forward turning, the operator backs it off a turn or two. This, basically, is the operation achieved by the subject system.

Circuit 20 supplies pulsating direct current of half-sinusoidal wave form at twice the frequency of the alternating current input of power supply 8 to SCR bridge 22. Bridge 22 is rendered non-conductive, or "off" at the zero voltage point between said incoming positive pulse, and if less than full power is desired for armature winding 15, it is held "off" for a predetermined length of time before it rendered conductive, or "on" so that only a predetermined portion of each incoming pulse is permitted to energize armature 15. This determines the power supplied to the motor. Also, only half of SCR bridge 22 is rendered active at any given time, and this determines the direction of the current fed to armature 15 and, hence, its direction of rotation.

Alternating current synchronized with the pulsating direct current output of power supply 8 is fed via supply line 24 to a combined manual and automatic phase control device 26 which can be set manually to advance or retard the phase of the alternating current in its output line 28 and the advance or retarding of this phase relating to the timing of the direct current pulses to the SCR bridge 22 via line 20 ultimately controls the lengths of the periods during which SCR bridge 22 is "on" and, hence, the power supplied to armature 15. A control signal for the manual and automatic phase control device 26 is also picked off power supply circuit 20a via line 30. If motor 2 speeds up above a desired normal number of revolutions per minute as a result of reduced load on it, the voltage in power supply line 30 increases and if motor 2 slows down below a desired r.p.m. as a result of increased load on it, the voltage in power supply line 20a drops. Device 26 responds to the voltage sensed via line 30 so as to retard the phase of the alternating current in its output line 28 and ultimately reduce the power output of SCR bridge 22 in event motor 2 speeds up above a desired r.p.m. Since it is desired that motor 2 be permitted to run faster in a reverse direction, when it is backing the tool out of the work, then in its forward direction, the automatic phase control affected by device 26 is non-symmetrical so that it comes into play at a higher sensed voltage when the current in power supply circuit 20 is in such direction as to reverse motor 2 than when the current is in such direction as to drive motor 2 forwardly. For purposes of exposition it will be assumed that the forward direction of motor 2 is when armature 20 rotates clockwise to drive the tool forward into the work and the reverse direction is when it rotates counterclockwise to withdraw the tool.

From manual and automatic phase control device 26, alternating current of advance or retarded phase is fed via output line 28 to a combined rectifier and pulse shaper 32 wherein the alternating current is rectified and clipped to form generally square wave pulses which are supplied via line 34 to a pulse routing device 36 which is essentially an electronic double pole, double throw switch, and which, depending upon its setting, routes the pulses supplied thereto via line 38 or line 40 either to a forward pulse amplifier 42 or a reverse pulse amplifier 44. The pulses fed from forward pulse amplifier 42 via line 46 to bridge control 48 cause that half of the SCR bridge 22 to conduct so that the current output thereof is in the direction to drive motor 2 forwardly, and the pulses from reverse pulse amplifier fed to bridge control 48 via line 50 causes the other half of SCR bridge 22 to conduct so that its current output is such as to reverse motor 2.

The basic pulse routing effected by device 36 is effected by a foot switch 52 connected by circuits 54 to a forward and reverse relay 56, which essentially is a bistable multivibrator flipped to one mode or the other by moving the foot switch 52 in one direction or the other. The setting of switch 52 determines whether the basic mode of operation of motor 2 shall be in the forward or reverse direction.

As previously indicated, motor 2 is controlled so that it drives the tool T forwardly about three seconds for several turns and then reversely for about a quarter of a second a turn or two. Also, when the basic directional mode of the motor has been determined by the setting of foot switch 52 so that armature 15 runs in the reverse direction, it will also be controlled so that it runs about three seconds for several turns in the reverse direction and, periodically, in the forward direction for about a quarter of a second so as to prevent the tool from hanging up in the work. This is accomplished by a long and short cycle control 58 which is essentially a free-running asymmetrical multivibrator which remains in a "long" state for, for example, about three seconds and then flips to a "short" state where it remains for about ¼ a second. Long and short control 58 is connected to pulse routing device 36 via a "long" channel 60 and a "short" channel 62, one or the other of which is always active depending upon the state of control 58. Thus, if switch 52 has been set to route pulses to forward pulse amplifier 42, it will do so for about three seconds until control 58 flips to its short mode, thereby to cause pulse routing device to route pulses to reverse pulse amplifier 44 for about ¼ second. The duration of the long and short states can be predetermined by selection of the values of the capacitors and/or resistances of the multivibrator which constitutes forward and reverse control 58. If switch 52 has been set so that the basic mode of pulse routing device 36 is to route pulses to reverse pulse amplifier 44, it will do so for about three seconds and then it will switch the pulses to the forward pulse amplifier 42 for about ¼ a second.

One of the problems in driving and controlling a load device such as motor 2 with an SCR bridge is that the back emf from the load tends to keep the bridge "on," and hence the control of the bridge is lost. In this system there is provided a combined overload sensing device and cyclic cut off 64 which is connected in the ground return circuit 66 for the pulsating direct current supply line 20 of the SCR bridge. Every time the voltage in supply line 20 drops to zero, or nearly zero, device 64 completely cuts off the power supply to the SCR bridge, thereby assuring an "off" condition for the bridge at the start of the next direct-current pulse input thereto. Device 64 also senses excess current indicative of an overload in power supply line 20 and an increased voltage in its output lines 68, 68a causes one of two different things to happen. In event an overload of damaging magnitude, normally closed overload relay 16 is opened, thereby opening power supply line 16. In event of a transient mechanical caused by normal working of the tool, a reversing trigger 70 is actuated by the over-voltage resultant from excess current flow in power supply line 20. Trigger 70, which is connected to long and short cycle control 58 via a circuit 72 causes the long and short cycle control to reverse if the latter is in its "long" state.

When the motor 2 is momentarily reversed, excess current is momentarily drawn, and this would normally appear as an overload to a current sensor such as device 64. However, trigger 70, being an electronic device and by nature extremely fast acting, would normally cause cycle control 58 to reverse prematurely back to its "long" state. To prevent this, a blanking circuit 74 having an input 72, 77 from long and short cycle control 58 and an output 78 to reversing trigger 70 is provided so as to render reversing trigger 70 inactive each time long and short cycle control 58 undergoes a reversal from its "long" state to its "short" state. The sensitivity of reversing trigger 70 may be set by a manual sensitivity control 76 connected thereto by circuit 80.

Many of the system components, such as motor 2, limit switches 6, power supply 8, off-on- control 12, rectifier and pulse shaper 32, forward and reverse foot switch 52, and forward and reverse relay 56 are conventional and need no description of their circuitry in order to understand them. However, for those components which are not conventional, or which have special relations with associated components, the following will serve to instruct those skilled in the art how to produce and connect them.

Figure 2:
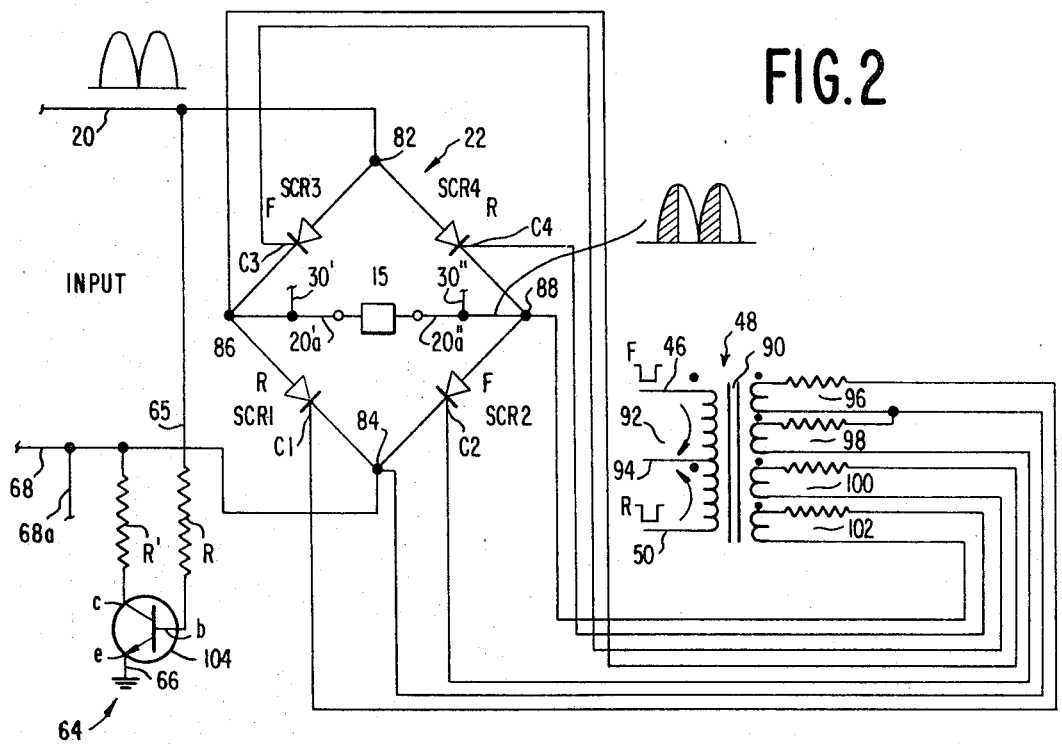
FIG. 2 is an elementary circuit diagram of the SCR bridge, the bridge control, and the overload sensing and cyclic cut-off device for the SCR bridge.

Referring now to FIG. 2, direct control of the direction of current flow and "on-off" time of SCR bridge 22 is effected by bridge control 48. Positive half-wave pulses are supplied by power circuit 20 to bridge corner 82 and the negative return line 66 to ground is from bridge corner 84. The load, which is motor armature 15, is connected by power output leads 20a', 20a" which are connected across bridge corners 86 and 88, and in the four sides of the bridge are the silicon controlled rectifiers SCR1, SCR2, SCR3, SCR4, having control electrodes C1, C2, C3, C4 which, when energized in the proper sense, render the anode-cathode circuits of their associated rectifiers conductive or "on." Only opposite pairs, such as SCR1 and SCR4, or SCR2 and SCR3 are turned "on" at any one time. Thus, if SCR3 and SCR2 are "on," current flow through the bridge and load is from corner 82, through SCR3 to corner 86, through conductor 20a', through armature 15 in one direction, conductor 20a"

of power supply line 20a bridge corner 88, SCR2, and bridge corner 84 to ground via ground return line 66. If SCR4 and SCR1 are "on," the current will flow through the other sides of the SCR bridge and through armature 15 in the opposite direction. The SCR's are turned "on" by pulses of relatively short duration and, one "on" they stay "on" so long as current continues to flow in the same direction in their anode-cathode circuits. "On" turning pulses are supplied to the control electrodes C1–C4 by bridge control 48 which is a transformer 90 having a center tap primary winding 92, the outer ends of which are connected via line 46 and 50 respectively leading from forward pulse amplifier 42 and reverse pulse amplifier 44, the center tap 94 returning to a connection common to both pulse amplifiers. Transformer 90 has four secondary widings 96, 98, 100, 102 respectively connected between control electrodes C1, C2, C3, C4 and the appropriate bridge corners so that if pulse current flows, for example from line 46 through half the primary winding 92 and out from center tap 94, the current induced in primary windings 98 and 100 is such as to bias SCR2 and SCR3 "on," while the current induced in secondary windings 96 and 102 biases SCR1 and SCR4 "off" and, in this example, it will be assumed that the direction of current through armature 15 causes it to rotate forwardly. If the flow of pulse current to the other half of primary winding 92 is from line 50 to center tap 94, the resultant direction of current flow through SCR bridge 22 causes armature 15 to rotate in reverse direction.

The instant at which the "on" turning pulses arrive at bridge control 48, as previously explained, is determined by the manual and automatic phase control device 26. If the "on" turning pulses are phased so as to arrive late with respect to the positive pulses input to the bridge, the bridge will be turned "on" only, for example, during the latter half of each incoming pulse and motor armature 15 receives only half the power it would have had the "on" turning pulses occurred at the start of each incoming power pulse.

As previously stated, the SCR's tend to stay "on" once curent flow is established therethrough. The back E.M.F. from motor 2 tends to maintain such current flow. In order to achieve cyclic cut-off of the flow of current the SCR bridge 22, device 64 is provided. Device 64 comprises a transistor 104 whose collector-emitter circuit $c$–$e$ is connected in the ground return line 66, and whose base $b$ is connected via resistor R to the positive power supply line 20. So long as the voltage applied to base $b$ is positive, transistor 104 closes the ground return circuit 66, but each time the power supply pulses drop to zero or nearly zero voltage, transistor 104 opens the ground return circuit 66, thereby preventing any current flow through the SCR's.

In event motor 2 becomes overloaded, excessive current flows through the collector-emitter circuit $c$–$e$ of transistor 104, thereby developing an abnormally high voltage across resistor R'. This abnormally high voltage actuates reversing trigger 70 as previously explained.

Figure 3:
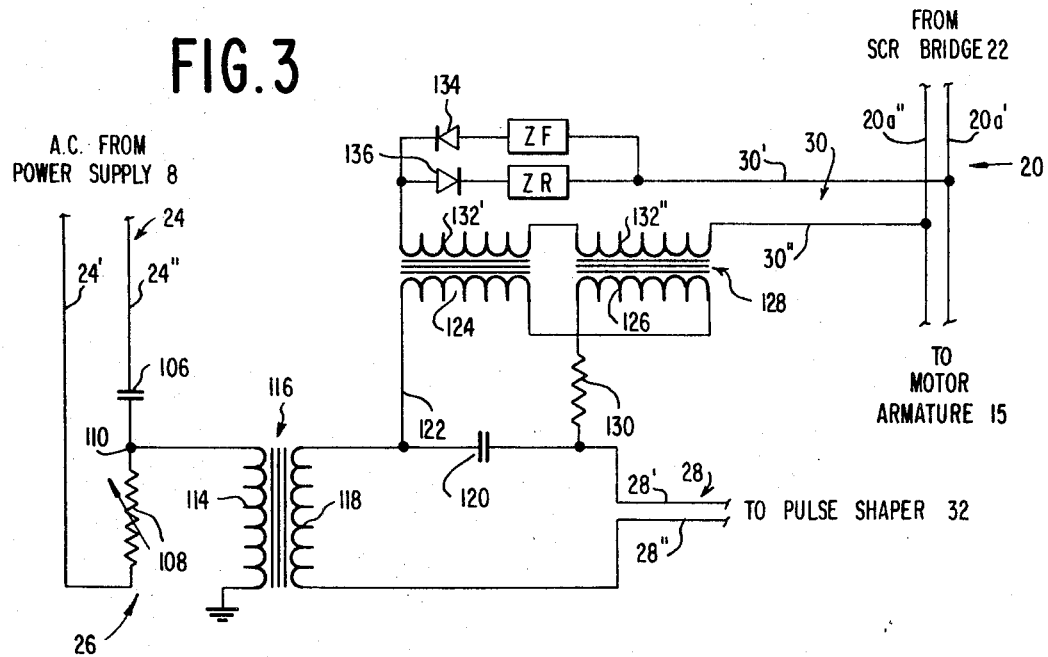
FIG. 3 is a circuit diagram of the manual and automatic phase control device.

FIG. 3 shows the circuit of the manual and automatic phase control device 26 which determines the times at which the "on" turning pulses arrive at the SCR bridge 22. Leads 24', 24" constitute the alternating current supply line 24 from power supply 8. Connected in series across leads 24', 24" are a capacitor 106 and variable resistor 108, and connected at a point 110 between them is one end of the primary winding 114 of a transformer 116. The other end of primary winding 114 is connected to ground. This is a well-known phase-shifting circuit, the phase of the alternating current in primary winding 114 being relatively advanced or retarded by adjustment of variable resistor 108 and thus adjusting the relative impedances of capacitor 106 and variable resistor 108. To the ends of secondary winding 118 of transformer 116 are connected leads 28', 28" which constitute the two sides of output line 28 leading to pulse shaper 32.

Automatic advance of the phase of alternating current flowing in output line 28 is achieved as follows: Connected in lead 28' is a capacitor 120 which, if not effectively shunted, advances the phase of the alternating current. Shunting capacitor 120 is a circuit 122 consisting of secondary windings 124, 126 of dual transformers 128 and a resistor 130. Windings 124 and 126 are connected in reverse sense so that current flowing in the dual primary windings 132', 132" will induce zero net voltage in shunt circuit 122. As will be seen shortly, dual transformer 128 operates as a saturable reactor. If current flows in primary windings 132', 132", transformer becomes saturated, the impedance of windings 124, 126 drops, and the alternating current flows in shunt circuit 122 around capacitor 120 at substantially the same phase as in primary winding 114 of transformer 116, and the "on" turning pulses delivered to the SCR bridge 22 occur at a relatively retarded time, and hence less power is delivered to motor armature 15. If, however, no current flows in primary windings 132, 132' the impedance of windings 124, 126 infinitely increases, thereby blocking the flow of alternating current in shunt circuit 122, and capacitor 120 is effective to advance the phase of the alternating current in output line 28 and the "on" turning pulses then reach SCR bridge 26 nearer the starts of the positive power pulses, and hence more power is delivered to motor armature 15.

The feed of current through primary windings 132', 132" of dual transformer 128 is through the two conductors 30', 30", which comprise line 30, and which are connected to the conductors 20a' and 20a" which comprise power supply line 20a. Let it be assumed that power pulses are flowing in power supply line 20 in such direction as to drive armature forwardly, i.e., they flow in through conductor 20a' and back through conductor 20a". In this condition, current will flow through windings 132', 132" via conductor 20', a Zener diode ZF, diode 134 and thence serially through windings 132', 132" and back to conductor 20a" via conductor 30". If, however, current is flowing to motor armature 15 in such direction as to cause it to rotate in the reverse direction, the flow of current will be reverse from that stated above, i.e., in through conductor 20a" and back out through conductor 20a'. Under this condition, current will flow via conductor 20" first to winding 132"', then winding 124 and via diode 136 and Zener diode ZR and conductor 20" to conductor 20a'.

The voltage appearing across conductors 20a' and 20a" rises and falls respectively with the increase and decrease in armature speed. Assuming motor 2 is to be allowed to run in the reverse direction faster than forwardly, ZR would be so selected as to have a threshold voltage higher than that of ZF. Thus, when armature 15 rotates, the phase-retarding effect of transformer 128 would come into play when the speed of armature 15 reaches a certain predetermined limit and the voltage across ZF or ZR rises enough to establish conduction therethrough. The net effect of the automatic phase control network is to limit the forward or reverse speed of armature 15 to selected maximum speeds and to speed up the armature when it slows down below the selected maximum speeds.

Figure 4:
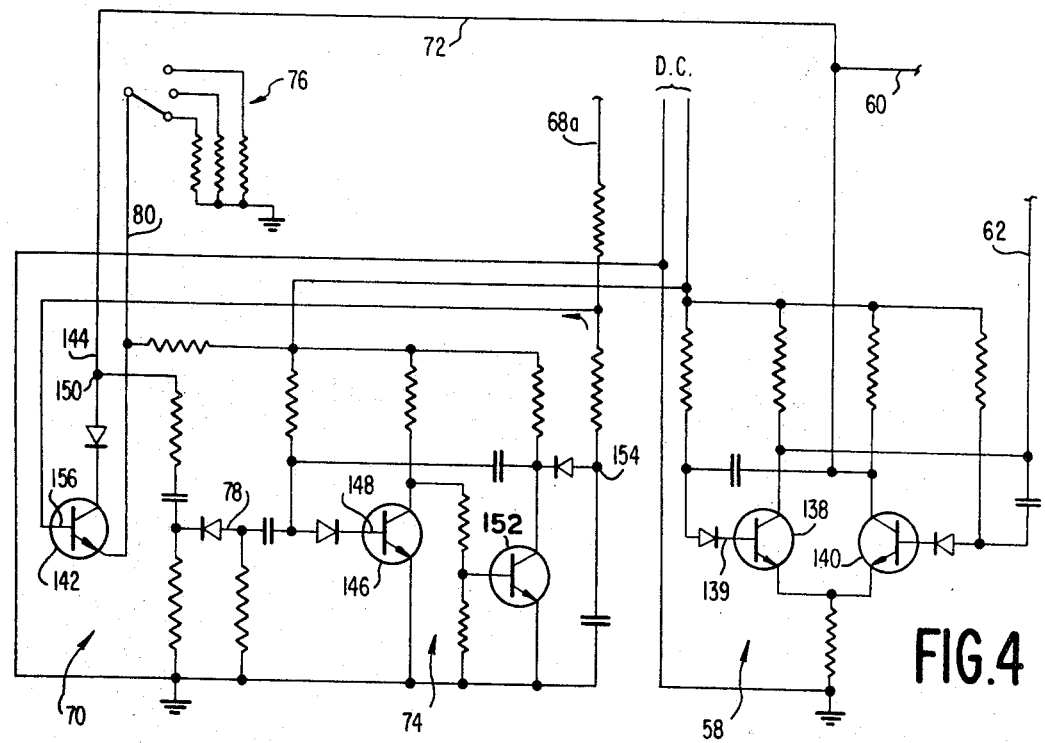
FIG. 4 is a circuit diagram of the reversing trigger and momentary blanking circuit therefor, and the long-and-short cyclic control.

FIG. 4 is a diagram of the relevant interrelated circuits of long and short cycle control 58, reversing trigger 70 and momentary blanking circuit 74. Long and short cycle control 58 is a free-running asymmetrical multivibrator in which transistor 138 is conductive for about three seconds and transistor 140 for about ⅓ of a second. When transistor 138 conducts, the voltage in "long" channel 60 is relatively positive, as is the voltage at base 139 of transistor 138, and the voltage in "short" channel 62 approaches negative. Ordinarily, transistor 142 of reversing trigger 70 is "off," but if its base voltage becomes positive, as it does when an overload-resulting voltage sensed across resistor R1 (FIG. 2) via output circuit 68a becomes positive, the voltage in its collector circuit 144 drops, thus imposing a negative pulse on base 139 of transistor 138 via circuits 72 and 60, thereby causing long and short control circuit 58 to flip to its short state, ultimately reversing motor 2 from whatever direction it was previously running. The sensitivity of trigger 70 is adjusted by selecting one of the different-valued resistors in manual sensitivity control 76 in the emitter circuit 80 of transistor 142.

The momentary reversal of motor 2 causes a false overload signal in circuit 68a which ordinarily would tend to actuate trigger 70, and the flipping of long and short control 58 causes certain transients which otherwise could cause trigger 70 and circuit 58 to undergo undesired regenerative action. In order to momentarily disable circuit 70 for a brief period following flipping of circuit 58 to its short state, there is provided a blanking circuit 74 which is a monostable multivibrator in which transistor 146 is normally conductive, its base 148 being coupled to the collector circuit of transistor 142 via circuit 78 at point 150. When circuit 58 flips to its short state, a negative-going pulse is applied to base 148 of transistor 146 via circuits 60, 72, 144 and point 50, thus turning transistor 146 "off" and its companion transistor 152 "on," and thereby dropping the voltage at point 154 which, being tied to the base 146 of transistor 142 via circuit 68a, clamps transistor 142 "off" at the start of each "short" state of circuit 58 and for about 1/10 of a second longer than the duration of the "short" state of circuit 58. Blanking circuit 74 thereafter flips back to its normal state in which transistor 146 is "on."

Figure 5:
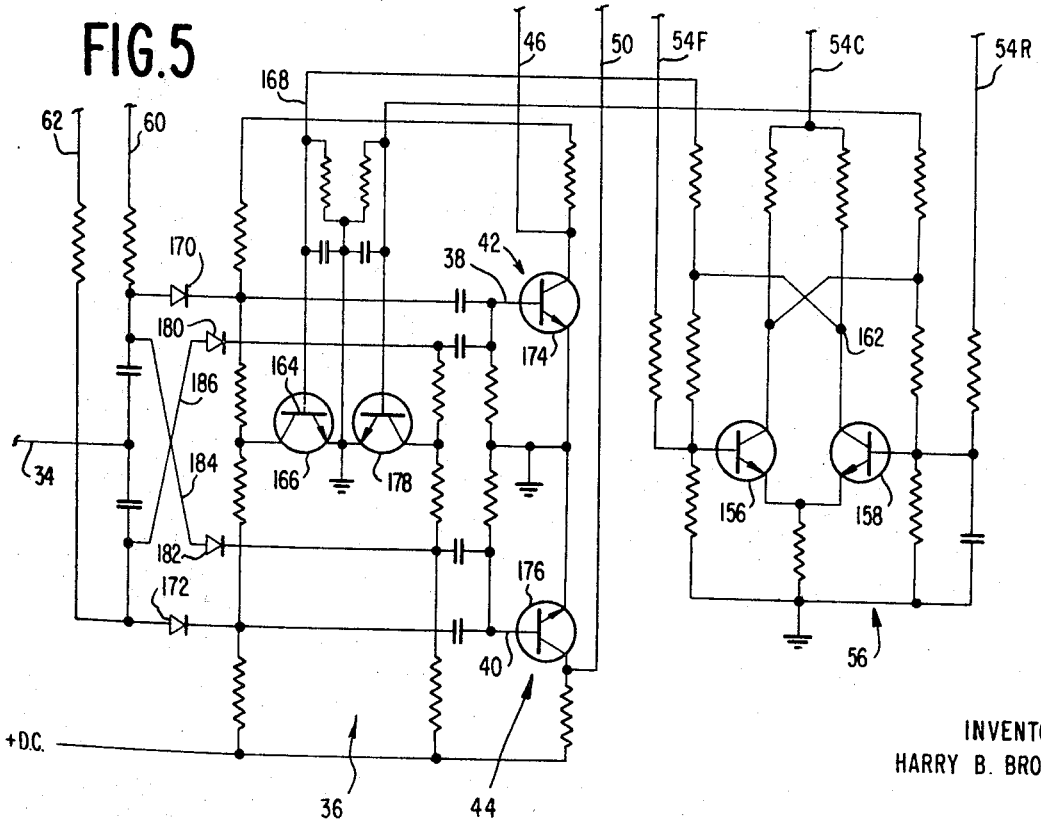
FIG. 5 is a circuit diagram of the pulse routing device, forward and reverse pulse amplifiers, and forward and reverse control relay.

FIG. 5 is a circuit diagram showing the interrelation of pulse routing device 36, forward and reverse amplifiers 42, 44, and forward and reverse relay 56, the latter of which is a bi-stable multivibrator including two transistors 146 and 158. Let it be assumed that forward and reverse switch 52 has been actuated so as to complete an "on" turning for transistor 156 via circuits 54C and 54F. The major turning movements of motor 2 are thus in the forward direction. Transistor 158 then being "off," the voltage in its collector circuit at point 162 goes positive thus rendering the base 164 of transistor 166 positive via circuit 168 and thereby holding transistor 166 "on." When transistor 166 is "on," its collector-emitter circuit establishes a bleed path to ground for diodes 170 and 172, both of which require a predetermined bias voltage, such as plus twelve volts, thereacross to become conductive. If long and short cycle control 58 is in its "long" state, a sufficient positive bias voltage is applied across diode 170 via "long" channel 60, and hence positive control signal pulses supplied from rectifier and pulse shaper 32 via line 34 will be routed to line 46 (leading to bridge control 48) via diode 170, line 38 and transistor 174 of forward pulse amplifier 174 thereby controlling the SCR bridge to energize motor 2 in forward direction. If, while transistor 166 is on, a relatively high positive voltage is impressed across diode 172 via "short" channel 62 (as will occur when cycle control 58 flips to its "short" state, in which case the voltage across diode 170 drops) then the signal pulses input via line 34 will be channeled to bridge control 58 via diode 172, line 40, transistor 176 of reverse pulse amplifier 44, thereby ultimately causing motor 2 to rotate reversely.

Let it be assumed, however, that switch 52 is actuated to close a reversing circuit via lines 54C and 54R. Transistor 156 goes "off," thereby imposing a negative voltage on base 164 of transistor 166 which turns the latter off and breaks the bleed circuit to ground of diodes 170, 172 so that the latter no longer can conduct. Transistor 178 is biased "on," thereby establishing a bleed path to ground for diodes 180, 182 so that if now a sufficient forward bias is applied to either diode 180 or 182, it will conduct. In this case, if a forward bias is applied via "long" channel 60, it will cross over via lead 184 and diode 182 will conduct control signal pulses input via line 34 to the reverse pulse amplifier 44 which causes bridge control 48 to control the SCR bridge 24 in such a manner to cause motor 2 to rotate reversely. When long and short control 58 flips to its "short" state, forward bias to diode 180 is applied via line 62 and crossover lead 186 so that the incoming control pulses from line 34 are routed via diode 180, forward pulse amplifier 42 and line 46 to bridge control 58 so that the SCR bridge is controlled to power motor 2 momentarily in the forward direction. Transistors 174 and 176 of forward and reverse pulse amplifiers 42, 44 are so biased that the biasing voltages, absent control pulses, applied across diodes 170, 172, 180 and 182 do not result in the application of control pulses to the control winding 46 of transformer 48 (FIG. 2).

From the foregoing it will be apparent that the system is adaptable for controlling the power and direction of current to various load devices. In the specific application to a motor which actuates a powered tool, the tool may be a tap, die, drill or other cutting device wherein the periodic reversal, the almost instantaneous reversal in response to overload, the automatic adjustment towards constancy of tool speed, or the relatively slow forward and fast reversal are desired. Thus the invention is not limited to the details disclosed and described herein but only by the scope of the following claims.

I claim:

1. A power control circuit including a pulsating direct current power supply having an output circuit delivering direct current pulses which swing from a nominal voltage to a voltage of greater value and back to the nominal voltage, an SCR bridge circuit having opposed input terminals respectively connected across opposite sides of the power supply circuit, a load connected across opposed output terminals of the bridge circuit, said bridge circuit having silicon controlled rectifiers connected between the input and output terminals each capable of being turned to an "on" condition by controlled pulses, means for supplying control pulses to said rectifiers whereby to vary the power supplied through said bridge to the load, and a voltage-responsive switch in the output circuit of said power supply for breaking said output circuit in response to swing thereof to said nominal voltage.

2. The power control circuit defined in claim 1, said voltage responsive switch comprising a transistor having the emitter-collector circuit thereof connected in series with one side of the power supply circuit and the base thereof connected to the other side of the power supply circuit.

3. In the combination claimed in claim 2, a resistor in series with said emitter-collector circuit, and relay means in said output circuit for opening the same in response to development of voltage of predetermined value greater than zero across said resistor.

References Cited

UNITED STATES PATENTS

| | | | |
|---|---|---|---|
| 3,222,587 | 12/1965 | Lichowsky | 318—380 |
| 3,328,598 | 6/1967 | Katz | 318—138 |
| 3,373,378 | 3/1968 | Cottrell | 318—138 |

ORIS L. RADER, Primary Examiner

K. L. CROSSON, Assistant Examiner

U.S. Cl. X.R.

318—257, 294; 321—18